Nov. 26, 1929.  C. H. GRAY  1,736,911
METHOD OF AND APPARATUS FOR COVERING CYLINDRICAL ROLLERS WITH RUBBER
Filed March 14, 1927  3 Sheets-Sheet 1

INVENTOR
Christian Hamilton Gray
by Byrnes, Stebbins & Parmelee
his attorneys

Nov. 26, 1929.  C. H. GRAY  1,736,911

METHOD OF AND APPARATUS FOR COVERING CYLINDRICAL ROLLERS WITH RUBBER

Filed March 14, 1927   3 Sheets-Sheet 2

INVENTOR
Christian Hamilton Gray
by Byrnes, Stebbins & Parmelee
his attorneys

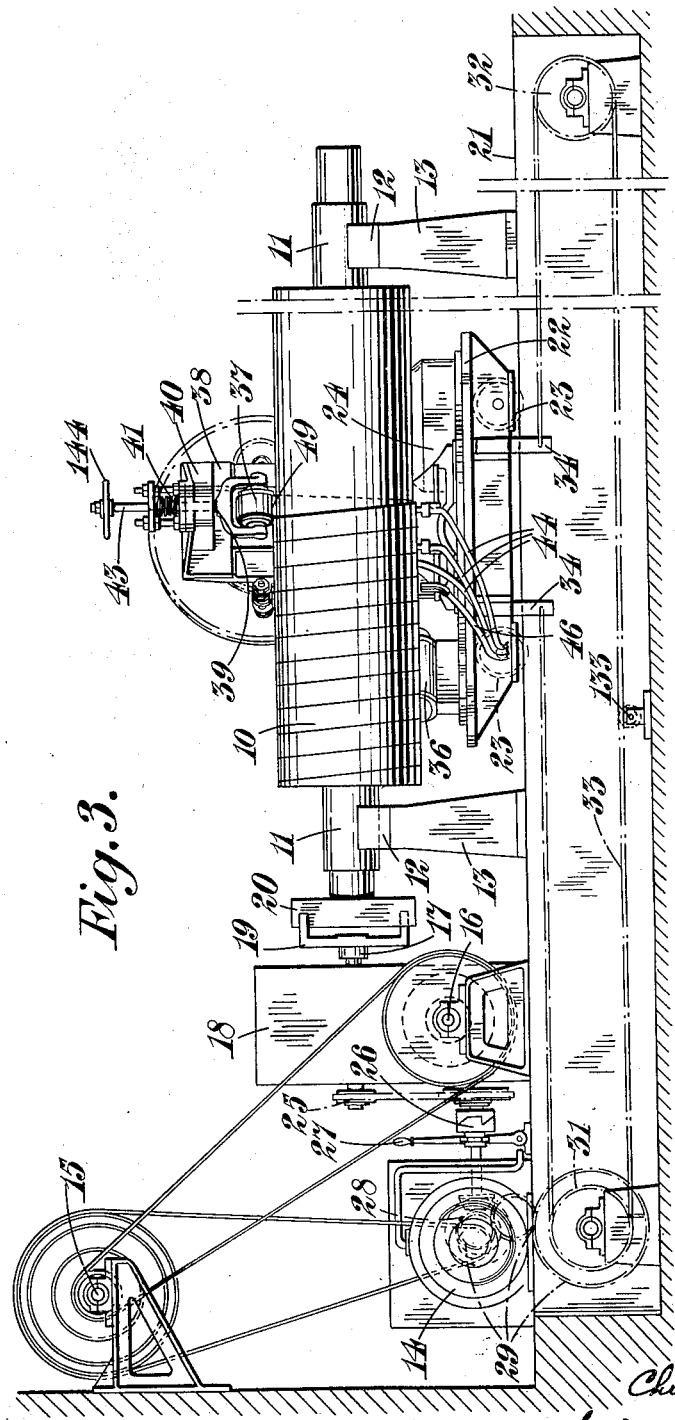

Patented Nov. 26, 1929

1,736,911

UNITED STATES PATENT OFFICE

CHRISTIAN HAMILTON GRAY, OF LONDON, ENGLAND

METHOD OF AND APPARATUS FOR COVERING CYLINDRICAL ROLLERS WITH RUBBER

Application filed March 14, 1927, Serial No. 175,261, and in Great Britain May 5, 1926.

This invention consists in an improved method of and apparatus for covering cylindrical rollers with rubber, the said method and apparatus being particularly suitable for covering with rubber large cylindrical rollers such as those used in machines for paper-making.

Heretofore in covering rollers of the aforesaid type with rubber it has been usual to apply the unvulcanized rubber compound in the form of thin calendered rubber sheet of convenient width and to wind the said rubber sheet around the roller until the desired thickness of covering has been obtained.

Where the rollers are of considerable size the aforesaid process is very expensive owing to the fact that it takes a very long time to complete, and further since many layers of rubber sheet are required to produce the desired thickness of rubber covering it is very difficult to ensure that no air is entrapped in the built-up covering. If air is so entrapped, blistering of the rubber generally occurs during the vulcanization, resulting in the whole job being spoilt.

According to this invention the method of applying a rubber covering to a cylindrical roller (such as a roller for paper-making machines) comprises laying a strip of rubber compound helically around the cylindrical roller.

The rubber strip may be formed with edges at right angles to the face of the strip and laid around the roller with the edges of adjacent convolutions abutting. Preferably, however, the edges of the rubber strip are bevelled in such manner that the resulting bevelled edges are parallel to one another thereby forming a scarfe joint between adjacent convolutions when the strip is laid around the roller with the edges of adjacent convolutions in contact.

It is also preferred to form the rubber strip by extrusion, and as it is extruded, to feed it to the cylindrical roller. As the strip is fed on to the cylindrical roller it may be pressed thereon by a pressure directed substantially radially of the roller.

In covering rollers of the type in which this invention particularly applies it is usual to apply a base layer of rubber compound to the surface of the roller the said compound being of such a character that upon vulcanization it forms a layer of ebonite or hard rubber and acts as a junction layer between the surface of the roller and the main rubber covering which is usually required to be of soft vulcanized rubber. Either the aforesaid base layer or the main rubber covering or both may be applied to the roller according to the process of this invention.

Where the main rubber covering is required to be of soft rubber and is applied according to the process of this invention it is preferably extruded in a thickness which is such that not more than two layers of extruded strip are necessary to produce the desired thickness of rubber covering on said roller.

Where more than one layer of rubber strip is applied to the roller the rubber strip of each layer may be applied to the roller so that the convolutions of rubber strip of all the layers pass helically around the surface of the roller in the same direction. Alternatively the convolutions of rubber strip in adjacent layers may be arranged to cross. Where the convolutions of rubber strip of all layers run in the same direction the convolutions in each layer are preferably so arranged that the joints between the convolutions in each layer are covered by the body portion of the extruded strip in an adjacent layer or layers.

The rubber covering built up as described is preferably vulcanized on the roller under consolidating fluid pressure — for example water pressure—in a vulcanizing chamber.

The invention also comprises the method of applying a rubber covering to the cylindrical roller consisting in the use of a combined guiding and pressure member for guiding and pressing the strip on to the cylindrical roller. This member may be a pressure roll and the method of the invention further consists in passing the strip around a substantial portion of the circumference of this pressure roll before applying the strip to the cylindrical roller.

Apparatus for carrying out the method according to the invention comprises means to support and rotate a cylindrical roller in combination with a co-operatively driven travelling carriage or the like arranged to move in the direction of the length of the roller and adapted to carry a rubber strip-producing apparatus for the purpose hereinbefore stated.

The travelling carriage preferably has means whereby the position of the strip-producing apparatus in relation to the cylindrical roller can be adjusted in order to vary the angle at which the rubber strip is delivered to the roller.

A pressure roll may be carried by the travelling carriage or by the strip-producing apparatus and arranged to press the rubber strip on the surface of the roller (for example under a yielding pressure) with or without means to adjust the pressure with which the pressure roll operates.

One form of apparatus according to the invention will now be described by way of example only with reference to the accompanying drawings, in which:—

Figure 3 is a sectional view on line 3—3 of Figure 2;

Figure 1:
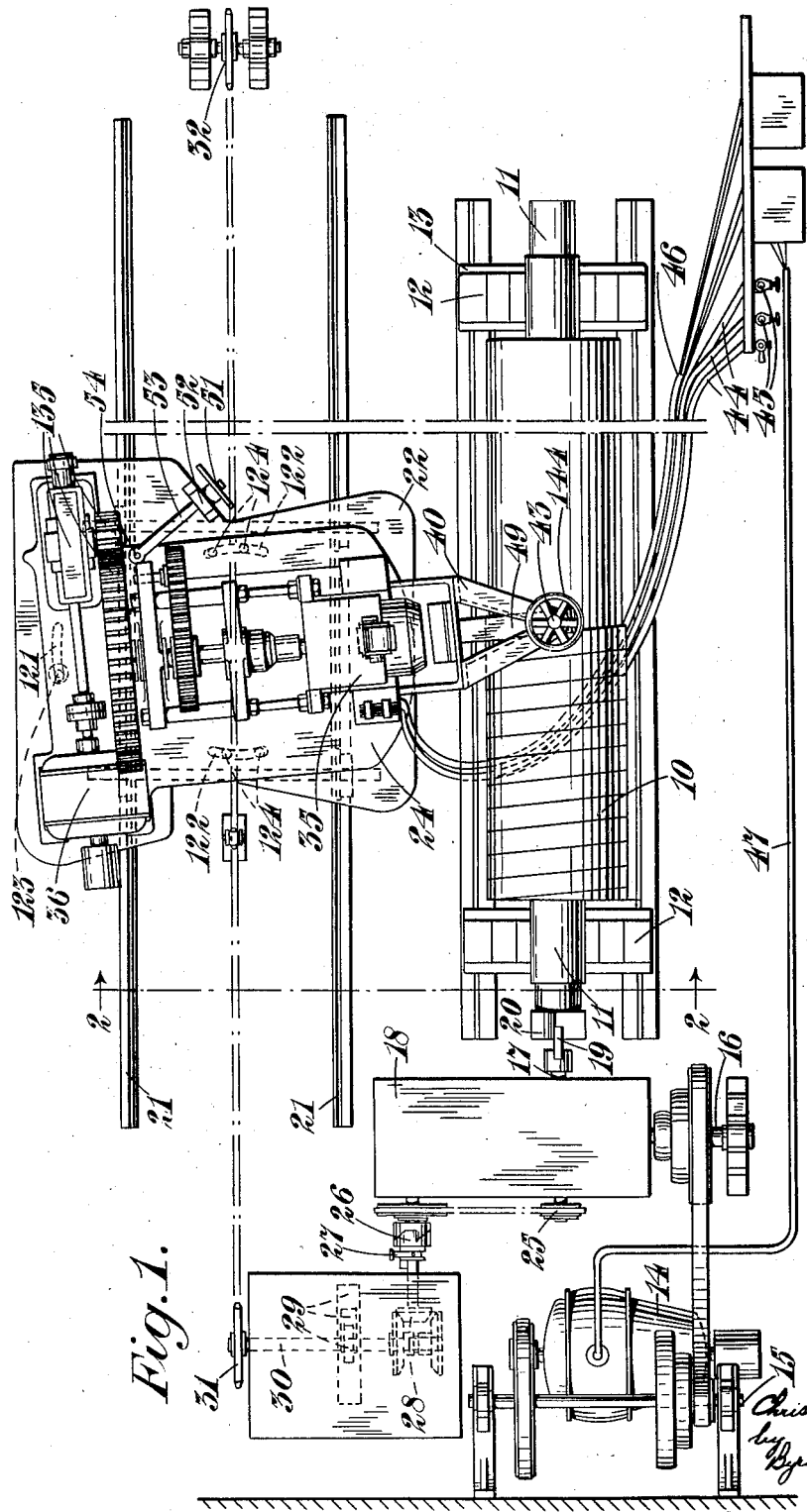
Figure 1 is a plan view.

Referring to the drawings, a cylindrical roller 10 is rotatably supported by means of its journalled ends 11, 11 on bearing members 12, 12 carried by a framework 13. A variable speed electric motor 14 drives, by means of belt and pulley arrangements and through a counter-shaft 15, a shaft 16 which in turn drives a shaft 17 through a speed-reducing gear 18. At one end of the shaft 17 there is secured a driver 19 adapted to engage a driving member 20 secured to a journalled end 11 of the cylindrical roller 10 whereby the latter is rotated.

Positioned in front of the bearing members 12 and parallel with the axis of the cylindrical roller 10 carried thereby, are two rails 21 spaced a suitable distance apart in the same horizontal plane. A travelling carriage 22 is mounted upon wheels 23 engaging with the rails 21 and has a partially rotatable platform 24.

In the travelling carriage 22 there are provided arc-shaped slots 122 and rollers 124 carried by the platform 24 engage in these slots to guide the platform in its rotary movement. This movement of the platform 24 is effected by means of a hand-wheel 51 rotatably mounted in a bearing member 52 on the travelling carriage 22 and engaging a screw 53 one end of which is pivotally mounted at 54 on the platform 24. In order that the platform 24 may be rigidly secured to the travelling carriage 22, slots such as 121 in the travelling carriage 22 are engaged by screwed studs such as 123 which are tightened to clamp the platform in the desired position on the travelling carriage.

The shaft 17 which serves to rotate the cylindrical roller also drives through chain-and-sprocket gearing 25, a clutch 26 which is operated by means of a hand-lever 27, and through speed-reducing and reversing gearing 28 and speed-reducing gearing 29, a shaft 30 carrying a chain sprocket 31 which is located near one end of the track of the travelling carriage. At the other end of the track there is rotatably mounted another chain sprocket 32, and a chain 33 engaging the sprockets 31 and 32 is connected at its ends to downwardly-extending bracket members 34 secured to the travelling carriage. The lower run of the chain 33 may be supported by means of one or more chain rollers 133. Thus by engaging the clutch 26 the travelling carriage may be caused to move along the rails 21 in a definite relation with the speed of rotation of the cylindrical roller 10 and by means of the reversing gear 28 can be moved back again in the opposite direction.

Mounted upon the platform 24 there is a rubber extruding or tubing machine 35 of the common type operated by means of an electric motor 36 through suitable reduction gearing 135 and adapted to produce the strip of rubber compound which is to comprise the covering for the cylindrical roller. An idle pressure roll 37 positioned above and in close proximity to the cylindrical roller 10 is rotatably supported in the forked end 38 of a spindle 39 which is carried by a bracket 40 secured to the rubber strip-extruding machine 35. The roll 37 is urged towards the roller 10 by means of a compression spring 41 which bears at one end upon the upper end of the spindle 39 and at the other end against the lower end of a screwed spindle 43 engaging in an extension 42 of the bracket 40 on the extruding machine 35. The compression of the spring 41 may be adjusted by means of a hand-wheel 144 carried at the upper end of the screwed spindle 43.

Flexible conduits 44 are provided for supplying gas, water and steam to the extruding machine 35 from supply mains 45 for heating and cooling the rubber compound therein in the usual manner, and controlling means therefor are provided on the platform 24. Another conduit 46 carries the electric mains for supplying the motor 36 of the rubber strip extruding machine and electric conductors for a control on the platform 24 for stopping, starting and varying the speed of the motor 14 which is supplied by electric mains carried in conduit 47. In this manner the operation of the rubber strip extruding machine, the rotation of the cylindrical roller and the movement of the travelling carriage are arranged to be completely under the control of a single operator from the platform 24 of the travelling carriage.

Figure 2:
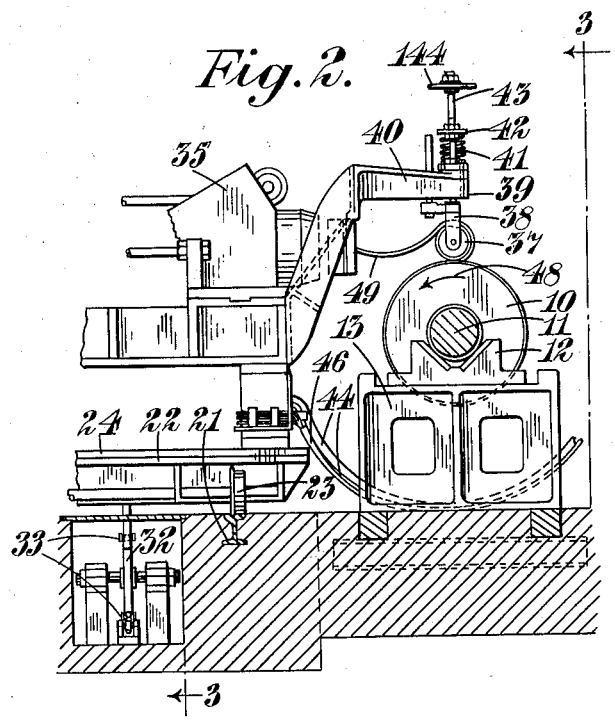
Figure 2 is a section on line 2—2 of Figure 1.

The cylindrical roller 10 is arranged to rotate in the direction indicated by the arrow 48 in Figure 2 and the rubber strip 49 is passed over the top of and around the pressure roll 37 and is laid upon the cylindrical roller 10 beneath the pressure roll. By rotatably adjusting the platform 24 with respect to the travelling carriage 22 the angle at which the rubber strip is applied to the cylindrical roller can be arranged to conform with the pitch of the helix to be formed by the rubber strip.

The speed at which the travelling carriage 22 moves on the rails 21 and that at which the cylindrical roller 10 rotates are fixed in relation to one another in accordance with the width of rubber strip to be applied to the cylindrical roller, and further the speed of both when fixed in relation to one another can be together varied in accordance with the rate of extrusion of said strip and the diameter of the cylindrical roller by varying the speed of the motor 14 by which both are driven.

Figure 4:
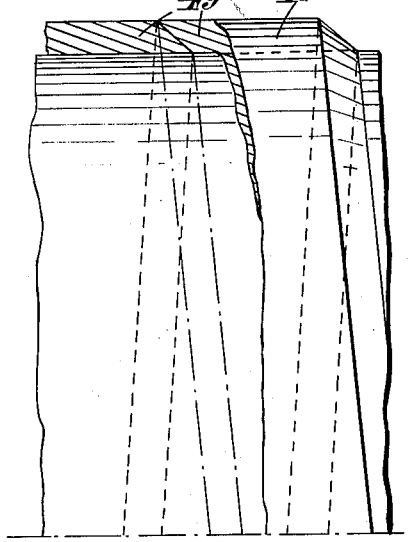
Figure 4 is a partial section showing the preferred formation of the applied strip.

The rubber strip which is extruded from the machine 35 and applied to the cylindrical roller 10 in accordance with the method hereinbefore described, is preferably formed with bevelled edges. In Figure 4 there is shown a portion of a cylindrical roller 10 and portions of two adjacent convolutions of the strip 49 applied to the roller, the bevelled edges being so proportioned that a scarfe joint is formed when the strip is applied to the roller with the bevelled edges in contact as shown.

It will be understood that apparatus other than that particularly described may be employed in carrying out the process and method of the invention. Moreover, the apparatus as hereinbefore described may be modified; for example instead of the extruding machine for producing the strip of rubber compound other means for this purpose such as a calender with an engraved roll, may be employed.

I claim:—

1. A method of applying a rubber covering to a cylindrical roller comprising forming a strip of rubber with edges bevelled in such manner that the resulting bevelled edges are parallel to one another and laying the strip helically around the cylindrical roller with the bevelled edges of the strip in adjacent convolutions in contact thereby forming a scarfe joint between adjacent convolutions when the strip is laid around the roller.

2. A method of applying a rubber covering to a cylindrical roller comprising forming a strip of rubber with edges bevelled in such a manner that the resulting bevelled edges are parallel to one another, feeding the strip to a pressure roll and pressing the strip on to and around the roller in such a manner that the bevelled edges of the strip in adjacent convolutions are in contact, thereby forming a scarfe joint between adjacent convolutions when the strip is laid around the roller.

3. A method of applying a rubber covering to a cylindrical roller comprising successively laying a plurality of layers of rubber on the roller and applying each layer by forming a strip of rubber with edges so bevelled that the resulting bevelled edges are parallel to one another and laying the strip helically around the roller in such a manner that convolutions of one layer overlie and cover the edges of the convolutions of a previous layer, and with the bevelled edges of the strip in adjacent convolutions in contact whereby a scarfe joint is formed between adjacent convolutions of the strip in each layer.

4. A method of applying a rubber covering to a cylindrical roller comprising forming a rubber strip with edges bevelled in such a manner that the resulting bevelled edges are parallel to one another, passing the strip around a substantial portion of the circumference of a pressure roll, laying the strip helically around the roller under pressure of said pressure roll with the said edges of the strip in adjacent convolutions in contact, thereby forming a scarfe joint between adjacent convolutions when the strip is laid around the roller.

5. A method of applying a rubber covering to a cylindrical roller comprising successively laying a plurality of layers of rubber on the roller and applying each layer by progressively forming a rubber strip with edges so bevelled that the resulting bevelled edges are parallel to one another and as the strip is formed, passing it around a substantial portion of the circumference of a pressure roll, guiding the strip to the cylindrical roller and laying the strip helically around the roller under the pressure of said pressure roll directed substantially radially of the cylindrical roller in such a manner that convolutions of one layer overlie and cover the edges of the convolutions of a previous layer, and with the bevelled edges of adjacent convolutions in contact whereby a scarfe joint is formed between adjacent convolutions of the strip in each layer.

6. Apparatus for applying a rubber covering to a cylindrical roller comprising means to support and rotate a cylindrical roller in combination with a co-operatively driven travelling structure arranged to move in the direction of the length of the roller and adapted to carry a rubber strip-producing apparatus, and speed varying means provided on the travelling structure for varying the speed of rotation of the cylindrical roller and the drive of the travelling structure.

7. Apparatus for applying a rubber covering to a cylindrical roller comprising means to support and rotate a cylindrical roller in combination with a co-operatively driven travelling structure arranged to move in the direction of the length of the roller and adapted to carry a rubber strip-producing apparatus, and pressure means moving with the strip-producing apparatus in the direction of the length of the roller, to press the rubber strip on to the roller, and speed varying means provided on the travelling structure for varying the speed of rotation of the cylindrical roller and the drive of the travelling structure.

8. Apparatus for applying a rubber covering to a cylindrical roller comprising means to support and rotate a cylindrical roller in combination with a co-operatively driven travelling structure arranged to move in the direction of the length of the roller, a rubber strip-producing apparatus carried by said travelling structure, a spring actuated pressure roll carried by said travelling structure, said pressure roll receiving the rubber strip as it is produced and pressing said strip on to the roller, speed varying means provided on the travelling structure for varying the speed of rotation of the cylindrical roller and the drive of the travelling structure, and control means on the travelling structure for regulating heating means for the rubber strip-producing apparatus.

In testimony whereof I affix my signature.

CHRISTIAN HAMILTON GRAY.